United States Patent [19]
Hollowell et al.

[11] 4,346,858
[45] Aug. 31, 1982

[54] EXTERNAL RELEASE FOR REDUCED TENSION MECHANISM

[75] Inventors: William M. Hollowell, Pacific Palisades; Avraham Ziv, Sepulveda, both of Calif.

[73] Assignee: American Safety Equipment Corporation, San Fernando, Calif.

[21] Appl. No.: 164,843

[22] Filed: Jun. 30, 1980

[51] Int. Cl.³ .................. A62B 35/02; B65H 75/48
[52] U.S. Cl. .......................... 242/107; 242/107.4 R
[58] Field of Search .......... 242/107, 107.4 R–107.4 E, 242/107.6, 107.7; 280/802–804, 806–808; 297/475–478

[56] References Cited

U.S. PATENT DOCUMENTS

| | | | |
|---|---|---|---|
| 3,912,035 | 10/1975 | Ulert | 242/107.6 X |
| 3,973,786 | 8/1976 | Rogers, Jr. | 242/107.7 |
| 4,120,467 | 10/1978 | Stephenson | 242/107 |
| 4,153,274 | 5/1979 | Rogers, Jr. et al. | 242/107.7 X |
| 4,165,844 | 8/1979 | Tanaka | 242/107 |
| 4,261,531 | 4/1981 | Naitoh | 242/107.6 |

FOREIGN PATENT DOCUMENTS 2012560  8/1979  United Kingdom ............. 242/107.7

Primary Examiner—John M. Jillions
Attorney, Agent, or Firm—Poms, Smith, Lande & Rose

[57] ABSTRACT

An improved dual tension retractor mechanism for emergency locking safety belt retractors which allows application of main spring rewind bias without the necessity of an initial low tension belt rewinding. Application of the main spring rewind bias for belt retraction from low tension use mode is controlled independently of retractor reel winding or unwinding movements. The improvement includes a ratchet ring which is selectively rotatable relative said housing to allow reapplication of main spring rewind bias to the belt when the belt reel is in the low tension mode. Retractive rotation of the ratchet ring applies power rewind bias to the belt reel even though a bias blocking pawl remains engaged with the ratchet ring.

6 Claims, 7 Drawing Figures

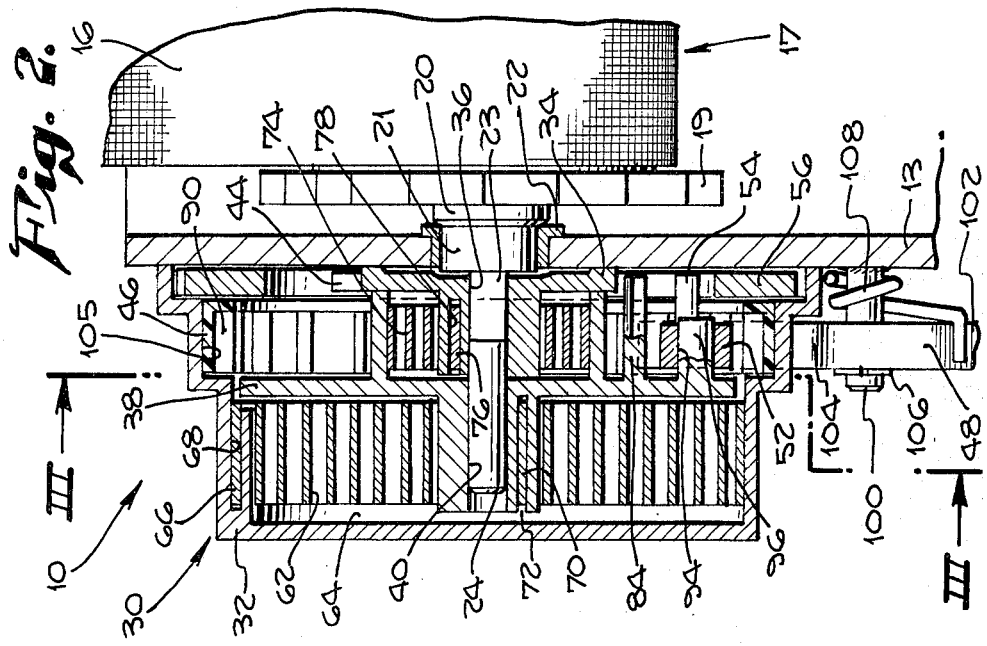
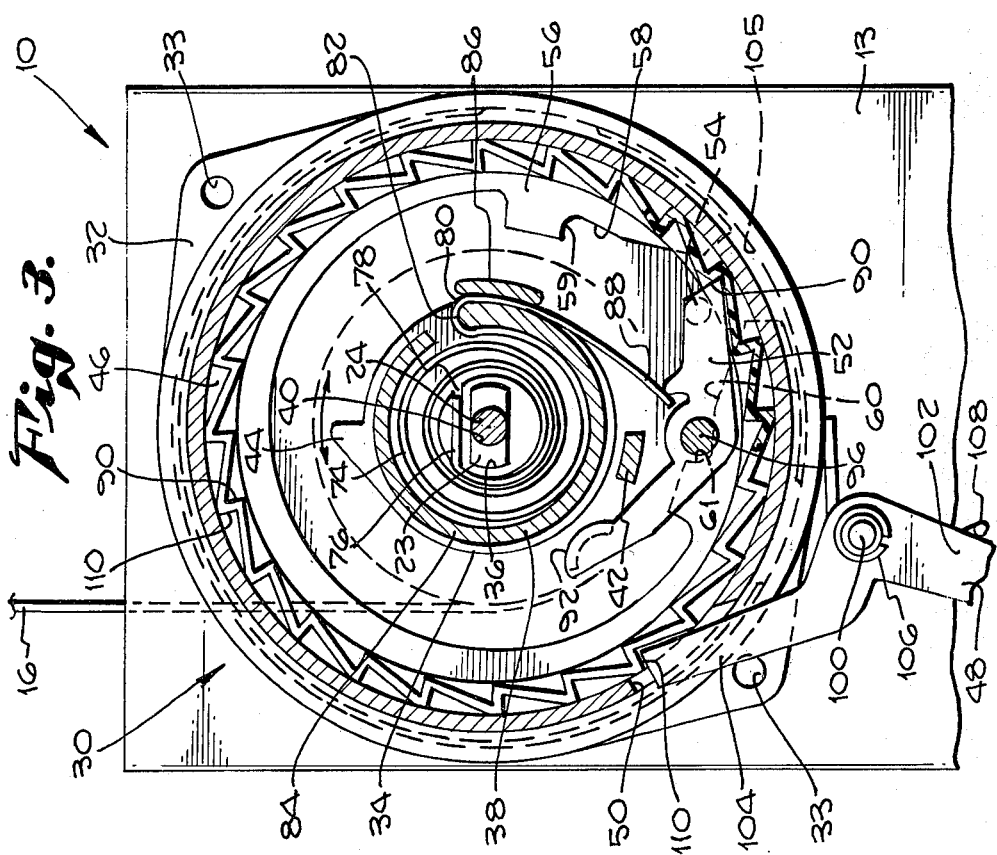

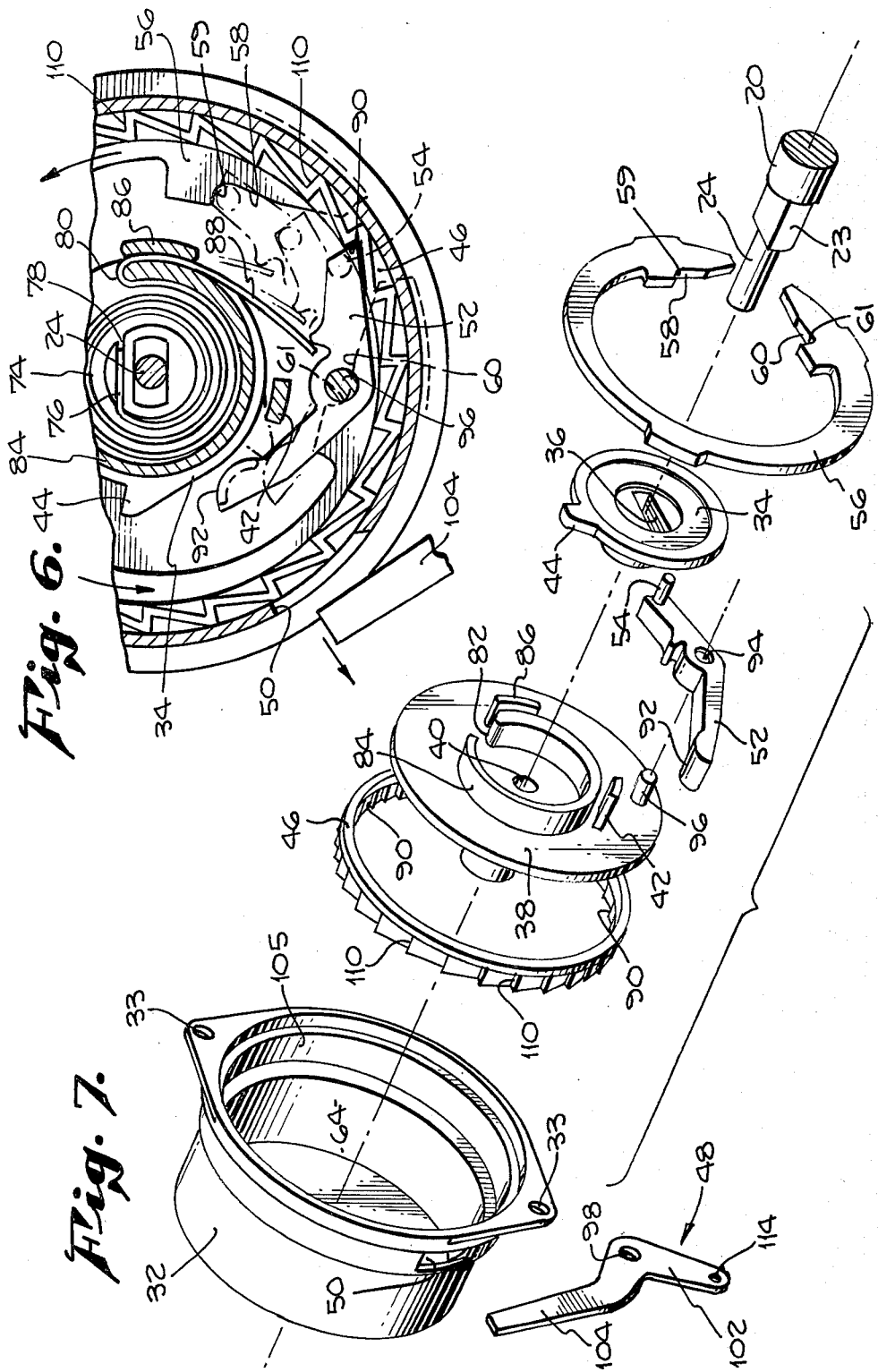

EXTERNAL RELEASE FOR REDUCED TENSION MECHANISM

BACKGROUND OF THE INVENTION

The present invention relates to retraction mechanisms for emergency locking safety belt retractors and more specifically to retraction mechanisms capable of selectively applying either of two different magnitudes of reel rewind bias to the safety belt retractor reel in response to rotational movement of the reel normally encountered during use of safety belt and harness straps employed with such retractors for holding vehicle occupants in their seats during emergency conditions.

Various types of dual tension safety belt retractor mechanisms have been employed heretofore for selectively applying a main spring rewind bias to the safety belt reel during normal belt protraction and retraction relative to the retractor and for applying a lower tension to the belt while the seat belt is in use about a vehicle occupant user.

As is presently known, it is desirable to reduce the tension in a chest belt of a safety harness for automotive passenger restraint when the belt is in use with an emergency locking type of retractor wherein the belt is prevented from protraction, reel unwinding movement, only when an emergency condition occurs. Since the belt is not prevented from an unwinding movement during normal wearing conditions, it is preferred that a rewind bias be continuously applied to the retractor reel in order to prevent buildup of slackness in the safety belt relative to the vehicle occupant employing such safety belt. Moreover, as is also known in the art, it is preferred that when the belt is in use, such rewind bias to prevent slackness in the belt be of a lower value than that normally applied for rewinding the belt onto the retractor reel when the belt is taken out of use.

An inherent feature of prior art dual tension safety belt retractors is the provision for reapplying the main spring bias to the safety belt reel when the belt is being used in the low tension biased mode and retraction of the belt is desired. Exemplary of such prior art dual tension retraction mechanisms are those disclosed in U.S. Pat. No. 4,165,844 issued to Akira Tanaka on Aug. 28, 1979. In the Tanaka patent, the main rewind spring is blocked out or locked to the retractor housing when the belt is in use (low tension mode). The unblocking or unlocking of the main spring for power retraction of the belt is accomplished by a partial rewinding of the belt reel under the low tension bias. This preliminary low tension rewinding which is necessary for reapplication of the main spring rewind bias is not always desirable. In many instances, for example when exiting a vehicle, it may be desirable to apply main spring rewind bias to the safety belt reel immediately without the necessity of a slow or occupant assisted initial rewind movement. Further, in this type of dual tension safety belt retractor mechanism, the degree to which the low tension bias may be lowered to ensure occupant comfort is limited since sufficient low tension bias must be maintained to allow positive retraction of the safety belt and buckle to ensure adequate rewind rotation to actuate the main spring rewind bias.

While the above discussed version of a dual tension retractor is believed to be commercially practicable and a satisfactory solution to a dual tensioning mechanism for emergency locking safety belt retractors, it has been recognized that it would be desirable to design a retractor having an externally operable release for applying main spring rewind bias to the safety belt for retraction without the necessity of an initial partial low tension biased belt retraction.

SUMMARY OF THE INVENTION

It is therefore an object of the present invention to disclose and provide a dual tension retractor mechanism wherein application of main rewind spring bias to the safety belt reel for belt retraction can be accomplished without an initial low tension rewinding movement of the safety belt reel.

A further object of the present invention is to disclose and provide a dual tension retractor mechanism wherein external means are provided for actuating application of main rewind spring bias to the safety belt reel independent of unwinding and rewinding movement of the safety belt reel.

Another object of the present invention is to disclose and provide a dual tension safety retractor mechanism wherein reapplication of the main spring rewind bias to the safety belt reel (while the safety belt reel is in the low tension use mode) is accomplished in response to external mechanical, electrical or vacuum/pressure actuation.

Generally, the present invention is an improvement on a dual tension safety belt retractor having a belt storage reel rotatably mounted to a retractor frame by a reel shaft. A shaft end protrudes from a frame sidewall to which a retraction mechanism is mounted to apply either a low tension or power rewind bias to the reel via the shaft in response to reel unwinding and winding. The power rewind bias is blocked out upon rotation of the reel in a rewind direction after an initial unwinding reel rotation. With the power rewind bias being blocked out, there is provided a low tension mode where only low tension bias is applied to the safety belt reel. The power rewind bias is reapplied to the safety belt reel by a low tension biased rotation of the reel in a rewind direction. The improvement of the present invention involves providing for reapplication of the power rewind bias to the safety belt reel without requiring a first low tension biased rotation of the safety belt reel in the rewind direction.

The improvement of the present invention is preferably applied to a dual tension retractor mechanism having a pawl carrier rotatably mounted on the retractor reel shaft end within an associated housing providing a power spring receiving chamber in which a power spring is disposed in operable association with the housing and pawl carrier to normally bias the pawl carrier in a direction to cause rewinding of the retractor reel. The pawl carrier acts through engagement with a shaft mounted cam for biasing the reel. Pawl means is also provided pivotally mounted on the pawl carrier for rotation relative to and with the carrier and selectively engageable with ratchet means formed about an interior surface of the housing.

Engagement of the pawl means and ratchet means prevents rotation of the pawl carrier and blocks out application of power spring bias to the retractor reel to allow operation of the mechanism in the low tension mode. The improvement of the present invention provides means for unblocking the power spring bias while the pawl means is engaged with the ratchet means. This is accomplished by providing means for selectively rotating the ratchet means relative the housing to allow rotation of the pawl carrier while the pawl means and ratchet means are engaged. This effectively allows an external means for overriding or releasing the blocking action of the pawl and ratchet means engagement without the low tension rewinding or other actuation necessary to disengage the pawl means from the ratchet means.

The foregoing objects and various advantages of the present improvement in retraction mechanisms for emergency locking retractors will become apparent to those skilled in the art from a consideration of the following detailed description of exemplary embodiments of such mechanisms in accordance with the present invention. Reference will be made to the appended sheets of drawings which will be described first briefly.

BRIEF DESCRIPTION OF THE DRAWINGS

FIG. 2 is a section view of an exemplary embodiment of a dual tension retraction mechanism for a safety belt storage reel of an emergency locking retractor in accordance with the present invention.

FIG. 3 is a side section view of the exemplary embodiment of the dual tension retraction mechanism of FIG. 2 taken along the III-III plane showing the mechanism in a "low tension" mode.

FIG. 6 is a view as in FIG. 5 showing reapplication of the main power spring while the mechanism is in the "low tension" mode.

FIG. 7 is an exploded perspective view of components of the exemplary embodiment in dual tension retraction mechanisms of FIG. 1 through 6 with the exception of the springs.

DETAILED DESCRIPTION OF AN EXEMPLARY EMBODIMENT

The present invention will be described with regard to a particular preferred exemplary dual tension retractor mechanism as shown in FIGS. 1 through 7. This retractor mechanism is of the type disclosed in a prior U.S. Pat. No. 4,165,844, issued to Tanaka on Aug. 22, 1979. The disclosures made in the Tanaka patent are hereby incorporated by reference.

Figure 1:
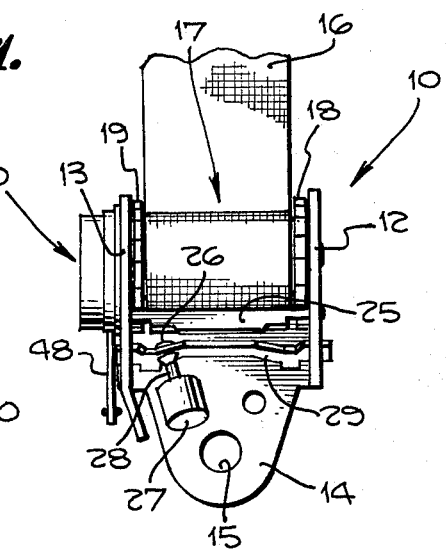
FIG. 1 is a top view of an exemplary emergency locking safety belt retractor in which the present invention is employed.

Referring initially to FIG. 1, an exemplary embodiment of emergency locking safety belt retractor is illustrated with which the present invention in dual tension safety belt retraction mechanism may be suitably employed. As seen in FIG. 1, an emergency locking vehicle inertia responsive retractor is illustrated generally at 10 and includes a U-shaped retractor frame having side walls 12 and 13 formed integrally of base 14 which is provided with a mounting aperture 15 for mounting the retractor in a suitable location in a vehicle for retracting an anchoring safety belt or harness webbing 16 on the associated reel indicated generally at 17. As seen in FIGS. 1 and 2, the safety belt reel, indicated generally at 17, includes a pair of ratchet wheels 18 and 19 mounted on a reel shaft 20 which is journaled by bearing portions at opposite ends, as bearing portion 21 in FIG. 2, in bushings mounted to the retractor side walls, as bushing 22 is mounted to side wall 13 in FIG. 2. As will be discussed hereinafter, shaft 20 is further provided with a rectangular end portion 23 and a still further extension portion 24 of cylindrical configuration for cooperating with components of the dual tension retraction mechanism of the present exemplary embodiment as explained hereinafter.

The exemplary retractor, indicated generally at 10, in FIG. 1 is of the vehicle inertia sensitive type wherein a lock bar 25, pivotally mounted between side walls 12 and 13, is tiltable into locking engagement with ratchet wheels 18 and 19 in now conventional manner in response to actuation by actuator head 26 of pendulum 27 suspended by stem 28 and head 26 from brace 29 fixed between side walls 12 and 13. As is now known in the art, in the event of a sudden change in inertia of the vehicle, as in the event of a sudden deceleration of the vehicle, pendulum 27 will swing to cause its associated actuator head 26 to tilt lock bar 25 into locking engagement with ratchet wheels 18 and 19. However, during normal vehicle operation, the safety belt reel, indicated generally at 17, is free to allow belt winding and unwinding under the bias of the associated retraction mechanism. This allows occupant movement with the safety belt or harness in use with, as particularly contemplated within the present invention, a low tension mode of operation for belt 16 during use of belt 16 as part of a chest belt or harness as is also presently known in the art.

The retractor mechanism for applying both the power rewind bias and low tension bias to the safety belt reel 17 is shown generally at 30 mounted on side wall 13 of the retractor frame. In general, the mechanism includes a power rewind spring which is secured between the retractor housing and a pawl carrier to provide rewind spring biasing to the pawl carrier. The pawl carrier is rotatable about the reel shaft in either direction between positions of engagement with cam means non-rotatably mounted on the reel shaft. The power rewind bias is therefore applied to the shaft via the pawl carrier and cam. By locking the pawl carrier to ratchet means on the securely mounted housing, the power rewind bias is blocked out and prevented from being applied to the cam means. In this "low tension" mode, a lower tension spring connected between the cam and pawl carrier provides low level rewind bias to the cam means.

Now referring to FIG. 7, the exemplary dual tension retractor mechanism includes a housing 32 which encloses the major components of the retractor mechanism. Mounting holes 33 are provided in the housing for securely attaching the housing 32 to the retractor frame side wall 13 by bolts, threaded studs or the like. Cam means such as cam 34 is provided for conveying either of the two spring biases to shaft 20. The cam 34 is mounted in a non-rotatable fashion on the rectangular end portion 23 of shaft 20 by way of the mating rectangular orifice 36. The power rewind bias is applied to cam 34 by way of pawl carrier 38. The pawl carrier 38 is rotatably mounted on the round end 24 of shaft 20 by way of circular orifice 40. The pawl carrier 38 is therefore free to rotate about shaft 20 with application of rewind bias to shaft 20 being necessarily transferred to shaft 20 by way of cam 34. Stop 42 is provided on pawl carrier 38 to engage cam arm 44 on cam 34 to thereby apply the power rewind spring bias operating on pawl carrier 38 to shaft 20. Ratchet means such as ratchet ring 46 is provided for preventing rotation of pawl carrier 38 during low tension mode operation of the retractor mechanism. The ratchet ring 46 is releasably secured to housing 32 by ratchet ring stop pawl means such as release arm 48. The release arm 48 extends externally of housing 32 and passes through housing opening 50 to engage the ratchet ring 46. Pawl 52 is provided for locking the pawl carrier 38 to ratchet ring 46 to effectively block out the main power spring bias during low tension mode operation. Cam pin 54 is provided on pawl 52 to engage pawl silencer ring means, such as C-ring 56. When the cam pin 54 is retained on either C-ring retaining surface 58 or 60, the pawl 52 is prevented from locking to ratchet ring 46. The C-ring 56 is also provided with retaining stop surfaces 59 and 61 to prevent inward rotation of cam pin 54 off of retaining surfaces 58 and 61 respectively. Having briefly described the major components (excluding springs) of the exemplary embodiment, a detailed discussion of their cooperative operation follows.

The power rewind bias for shaft 20 is provided by power spring 62 as thus shown in FIG. 2. The power spring 62 is enclosed inside a power spring receiving chamber 64 defined by a portion of housing 32. An outer end 66 of power spring 62 is attached securely to housing 32 by way of slot 68. The inner end 70 of power spring 62 is securely attached to pawl carrier 38 by slot 72 in pawl carrier 38.

Low tension bias for application to shaft 20 during low tension mode use is provided by low tension spring 74. An inner end 76 of low tension spring 74 is secured to cam 34 in cam slot 78. The outer portion of low tension spring 74 is secured to pawl carrier 38 by a bend 80 in low tension spring 74 which seats against seating surface 82 on low tension spring housing 84. The outer portion of low tension spring 74 is further secured in place on pawl carrier 38 by spring retaining tab 86. In the preferred embodiment, the outer end 88 of low tension spring 74 is further utilized for biasing pawl 52 in a radially outward direction.

Figure 4:
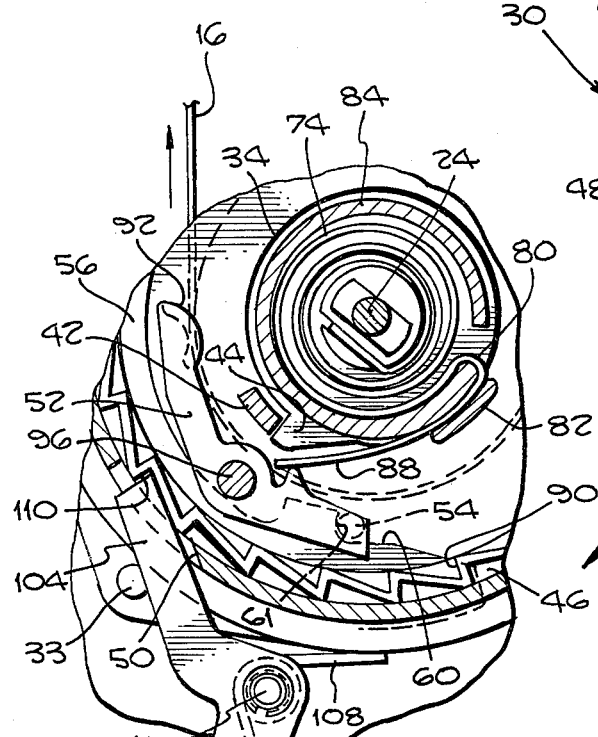
FIG. 4 is a side view as in FIG. 3 showing the mechanism during belt unwinding toward a position of use.

The unwinding or protraction of harness webbing 16 is shown in FIG. 4. During unwinding, the cam 34 is initially rotated until cam arm 44 contacts stop 42. In this position, the low tension spring is fully tightened. As the harness webbing is further protracted, the pawl carrier 38 is rotated in a clockwise direction. As the pawl carrier begins rotating in a clockwise direction, the cam pin 54 on pawl 52 contacts the C-ring 56 and is slidably moved away from engagement with inwardly facing teeth 90 to C-ring retaining surface 60. With the pawl 52 disengaged from the inwardly facing teeth 90, the pawl carrier 38 may be rotated to fully unwind the harness webbing 16 for occupant use.

After the harness webbing 16 has been unwound to the position of desired use, a slight counterclockwise rotation of pawl carrier 38 slides the cam pin 54 off of the C-ring retaining surface 60 thereby allowing the pawl to be spring biased into engagement with ratchet means, such as the ratchet ring inwardly facing teeth 90. The engagement of the pawl 52 with the inwardly facing teeth 90 prevents further counterclockwise or rewinding rotation of pawl carrier 38. By preventing the rewinding rotation of pawl carrier 38, the main power spring bias is effectively blocked and will not be applied to shaft 20.

Figure 5:
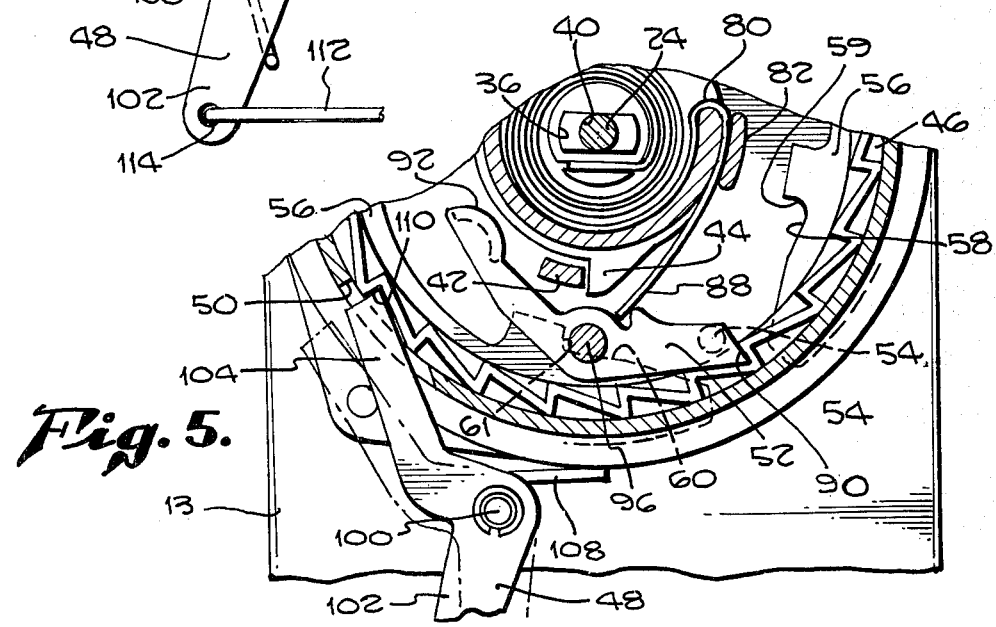
FIG. 5 is a view as in FIG. 4 showing the mechanism after a slight retraction of the safety belt following a protraction as illustrated in FIG. 4.

Once the retractor mechanism is in the low tension mode as shown in FIG. 5, the cam 34 may be rotated against the low tension bias of spring 74 in a counterclockwise or rewind direction. The cam 34 may be rotated in this low tension mode to various positions of rotation between stop 42, one such position being shown in FIG. 3. As the harness webbing 16 is retracted under the low tension spring bias the cam 34 rotates in a counterclockwise direction until cam arm 44 contacts the camming surface 92 on pawl 52 to cause rotation of pawl 52. Pawl 52 is mounted to the pawl carrier 38 by means of a centrally located circular hole 94 which allows rotatable mounting to pin 96 on pawl carrier 38. The rotation of pawl 52 by the contact of cam arm 44 against camming surface 92 disengages the pawl 52 from the ratchet ring inwardly facing teeth 90, thereby unblocking the main power spring bias. As the pawl carrier begins rotating in a counterclockwise direction to retract or wind the harness webbing 16, the cam pin 54 contacts C-ring 56 and is slidably moved up onto retaining surface 58 where it is retained out of engagement with the ratchet ring inwardly facing teeth 90.

When it is desired to reapply or unblock the power spring bias without the above described low tension bias rotation of cam 44 to contact camming surface 92, the ratchet ring 46 is released by release arm 48 to allow rotation of pawl carrier 38 even though pawl 52 is engaged with inwardly facing teeth 90. The release arm 48 has a centrally located mounting hole 98 which is rotatably mounted on pin 100 which is secured to side wall 13. The release arm 48 has an outer actuating arm 102 and an engagement pawl arm 104. A retaining ring 106 or other suitable retainer is provided for preventing the release arm 48 from slipping off of pin 100. Further, release arm bias spring 108 is provided for biasing the engagement pawl arm 104 inwardly towards engagement with ratchet ring 46.

The ratchet ring 46 is not only provided with inwardly facing teeth 90 on the radial inward surface thereof, but is also provided with outwardly facing teeth 110 on the radial outward surface thereof. The ratchet ring 46 is freely rotatable within housing 32 as long as the outwardly facing teeth are not engaged by engagement pawl arm 104. The ratchet ring 46 is mounted within a ring rotation chamber 105 (see FIG. 7) formed by housing 32. In this way, means are provided for selective annular rotation of the inwardly facing teeth 90 or ratchet means.

When the engagement pawl arm 104 is engaged with the outwardly facing teeth 110 as shown in FIGS. 3, 4 and 5, the exemplary dual tension retractor mechanism operates in the same manner as the retractor mechanism disclosed in the Tanaka patent. However, when the engagement pawl arm 104 is rotatably moved away from engagement with outwardly facing teeth 110 (as shown in phantom in FIG. 5) the ratchet ring 46 is free to rotate. Since in the low tension mode, the power spring 62 is biasing the pawl 52 against the inwardly facing teeth 90, the release of the ratchet ring allows rotation of the entire pawl carrier 38, pawl 52 and ratchet ring 46. As shown in FIG. 6, the counterclockwise rotation of the pawl carrier when the engagement pawl arm 104 is released, causes the cam pin 54 to contact C-ring 56 and slidably move the cam pin 54 onto retaining surface 58 thereby disengaging pawl 52 from the inwardly facing teeth 90. If desired, the engagement pawl arm 104 may then be moved back into engagement with outwardly facing teeth 110 to prevent rotation of ratchet ring 46.

Actuation of the release arm 48 between ratchet ring engaged and disengaged positions can be accomplished by a suitable linkage 112 which is attached to the actuating arm 102 in any convenient manner as shown at 114.

The linkage 112 may be actuated by any number of methods. For example, the linkage may be operated by manual switches, solenoids or air/vacuum pressure valves. The various actuating mechanisms may be coupled to actuate the linkage 112 upon door opening, buckle release, position of ignition switch or the like.

Use of the release arm 48 to allow application of power spring rewind bias to the reel 17 does not preclude the reapplication of power rewind bias in the conventional manner where cam arm 44 movably contacts camming surface 92 to disengage pawl 52. Therefore, power rewind bias may be applied in the conventional manner requiring a first initial low tension rewind, or the low tension rewind requirement may be by-passed when desired by disengaging engagement pawl arm 104 from outwardly facing teeth 110 to allow immediate rotation of pawl carrier 38 and resultant application of power rewind bias to shaft 20.

The outwardly facing teeth 110 are shaped so that when contacting engagement pawl arm 104 rotation of the ratchet ring 46 will be prevented in one direction only. Clockwise rotation of the ratchet ring is not prevented and is not necessarily prevented since biasing of pawl 52 against the ratchet ring 46 only occurs during power spring rewind bias in the counterclockwise direction only.

Having thus described an exemplary embodiment of the present invention, it should be noted by those skilled in the art that the within disclosures are exemplary only and that various other alternatives, adaptations and modifications may be made within the scope of the present invention. Thus, by way of example and not of limitation, if desired a clutch or other releasable locking means may be used to allow selective rotation of ratchet ring 46 rather than teeth/pawl engagement. Accordingly, the present invention is not limited to the specific embodiment as illustrated herein.

What is claimed is:

1. In a dual tension safety belt retractor including a frame having a frame side wall, a shaft rotatably mounted on the frame, a belt storage reel connected to the shaft, said shaft having an end protruding through the frame side wall, a retraction mechanism mounted to apply a power rewind bias and low tension rewind bias to said reel via said shaft, said retraction mechanism including a housing having an inner annular surface defining inwardly facing teeth, a pawl associated with said shaft and engageable with said teeth to block out said power rewind bias wherein the improvement comprises:
   means for selective annular rotation of said housing inner annular surface relative said housing whereby said power rewind bias may be applied to said shaft when said pawl is engaged with said teeth.

2. An improved retraction mechanism as in claim 1 wherein said means for selective annular rotation of said housing inner surface includes:
   a ratchet ring having a radially inward ratchet surface defining said inwardly facing teeth and a radially outward surface adjacent said housing;
   means for mounting said ratchet ring within said housing to allow annular rotation of said ratchet ring relative said housing; and
   means for releasably securing said ratchet ring to said housing to selectively prevent rotation of said ratchet ring relative said housing.

3. An improved retraction mechanism as in claim 2 wherein said means for releasably securing said ratchet ring to said housing includes:
   outwardly facing teeth on said radially outward surface;
   ratchet ring stop pawl means fixed relative said housing for releasably engaging said outwardly facing teeth and movable between ratchet ring engaged and disengaged positions; and
   means for actuating said ratchet ring stop pawl means between said ratchet ring engaged and said ratchet ring disengaged positions.

4. A dual tension retraction mechanism for an emergency locking safety belt retractor having a belt storage reel rotatably mounted by a shaft to the retractor comprising:
   a housing mounted to said retractor;
   a power spring mounted within said housing by an outer spring end and having an inner end;
   carrier means mounted for rotation relative said housing and having slot means for engaging said power spring inner end whereby said carrier means is biased by said power spring in a given direction;
   pawl means movably mounted on said carrier means;
   a ratchet ring releasably attached to the inner annular portion of said housing and radially outwardly of a rotative path of travel of said pawl on rotation of said carrier means, said ratchet ring presenting inwardly facing teeth to be engaged by said pawl means, said ratchet ring locking said carrier means against rotation in said given direction when said pawl means engages said ratchet ring;
   pawl silencer ring means slidably mounted relative said housing for holding said pawl means out of engagement with said ratchet means during normal reel movement on protraction and retraction of a safety belt relative said reel and allowing said engagement on a slight rewinding movement of said reel after protraction of the belt to a position of use;
   shaft cam means mounted in fixed relation on said shaft and cam abutting means on said carrier means for transmitting the bias of said power spring through said carrier means and cam means to said shaft when said pawl means is not in engagement with said ratchet ring;
   a lower tension spring connected between said carrier means and cam means for biasing said shaft in a belt rewind direction in a low tension mode when said carrier means is held against rotation; and
   ratchet release means for selectively releasing said ratchet ring from said housing to allow rotation of said pawl carrier when said pawl is engaged with said ratchet ring.

5. In a dual tension safety belt retractor having a belt storage reel rotatably mounted to a retractor frame by a reel shaft with a shaft end protruding from a frame side wall to which a retraction mechanism is mounted to apply either of two rewind biases upon said reel via said shaft in response to belt winding and unwinding movement, said retraction mechanism having a pawl carrier rotatably mounted on said shaft end and a pawl pivotally mounted on said carrier for rotation with and relative to said carrier; housing means for enclosing said pawl carrier and providing a power spring receiving chamber therewith; a power spring connected between said housing and pawl carrier for biasing said carrier in a given direction; ratchet means provided about an inner annular portion of said housing means and radially outwardly of a rotative path of travel of said pawl on rotation of said carrier, said ratchet means presenting inwardly facing teeth to be engaged by said pawl; means for biasing said pawl relative said carrier toward said teeth; pawl silencer ring means for normally holding said pawl out of engagement with said inwardly facing teeth during unwinding and rewinding reel rotation, said means being operable upon reel rotation in a rewind direction after an unwinding reel rotation to release said pawl into engagement with said inwardly facing teeth to thereby hold said carrier stationary relative said ratchet means; cam means driven by said shaft and stop means on said carrier for driving said carrier in a power spring winding direction on a belt unwinding movement of said reel shaft via said cam means engaging said stop means; a lower tension spring connected between said carrier and cam means for biasing said shaft in a belt rewind direction when said carrier is held stationary by said pawl engaging said inwardly facing teeth the improvement in said retraction mechanism comprising the provision of:

means for selective annular rotation of said ratchet means relative said housing means to allow rotation of said pawl carrier when said pawl is engaged with said ratchet means.

6. An improved retraction mechanism as in claim 5 wherein means for selective annular rotation of said ratchet means includes a ratchet ring having a radially inward surface defining said inwardly facing teeth and a radially outward surface adjacent the inner annular portion of said housing means;

means for mounting said ratchet ring within said housing to allow annular rotation of said ratchet ring relative said housing; and means for releasably securing said ratchet ring to said housing to selectively prevent rotation of said ratchet ring relative said housing.

* * * * *